(12) United States Patent
Wang et al.

(10) Patent No.: US 10,271,345 B2
(45) Date of Patent: Apr. 23, 2019

(54) NETWORK NODE AND METHOD FOR HANDLING A PROCESS OF CONTROLLING A DATA TRANSFER RELATED TO VIDEO DATA OF A VIDEO STREAMING SERVICE

(71) Applicant: Telefonaktiebolaget LM Ericsson (publ), Stockholm (SE)

(72) Inventors: Min Wang, Luleå (SE); Hans Hannu, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/520,713

(22) PCT Filed: Oct. 20, 2014

(86) PCT No.: PCT/SE2014/051234
§ 371 (c)(1),
(2) Date: Apr. 20, 2017

(87) PCT Pub. No.: WO2016/064308
PCT Pub. Date: Apr. 28, 2016

(65) Prior Publication Data
US 2017/0318602 A1    Nov. 2, 2017

(51) Int. Cl.
*H04W 72/12*       (2009.01)
*H04N 21/61*       (2011.01)
(Continued)

(52) U.S. Cl.
CPC ..... *H04W 72/1263* (2013.01); *H04L 47/2416* (2013.01); *H04L 47/30* (2013.01);
(Continued)

(58) Field of Classification Search
CPC ................................................. H04W 72/1326
See application file for complete search history.

(56) References Cited

U.S. PATENT DOCUMENTS

| | | | | |
|---|---|---|---|---|
| 7,587,549 | B1 * | 9/2009 | Arulambalam | ....... G06F 3/0613 |
| | | | | 711/112 |
| 9,246,576 | B2 * | 1/2016 | Yanai | ................ H04B 7/18543 |

(Continued)

FOREIGN PATENT DOCUMENTS

| | | |
|---|---|---|
| EP | 2 882 249 A1 | 6/2015 |
| WO | 2015026272 A1 | 2/2015 |
| WO | 2015147710 A1 | 10/2015 |

OTHER PUBLICATIONS

Supplementary European Search Report dated Nov. 22, 2017 for European Patent Application No. EP14904335 filed on Mar. 8, 2017 consisting of 7-pages.

(Continued)

*Primary Examiner* — Parth Patel
(74) *Attorney, Agent, or Firm* — Sage Patent Group

(57) ABSTRACT

A method in a network node relating to a process of controlling a data transfer related to video data of a video streaming service from a server to a wireless device is provided. The network node and wireless device operates in a wireless communications network. The network node determines a scheduling weight value for the wireless device to be used in the data transfer based on a target rate scheduling weight value and a proportional fair rate scheduling weight value. The network node then determines a size of data segment to be used in the data transfer based on at least part of the scheduling weight value. The network node further determines a pending data volume for the transferring of the video data to a play back buffer of the wireless device based on at least part of the scheduling weight value.

16 Claims, 13 Drawing Sheets

(51) Int. Cl.
| | |
|---|---|
| H04N 21/647 | (2011.01) |
| H04W 28/02 | (2009.01) |
| H04L 12/805 | (2013.01) |
| H04L 12/867 | (2013.01) |
| H04L 12/853 | (2013.01) |
| H04L 12/835 | (2013.01) |
| H04L 29/06 | (2006.01) |

(52) U.S. Cl.
CPC .......... *H04L 47/365* (2013.01); *H04L 47/629* (2013.01); *H04L 65/4069* (2013.01); *H04L 65/4084* (2013.01); *H04L 65/80* (2013.01); *H04N 21/6131* (2013.01); *H04N 21/64738* (2013.01); *H04N 21/64792* (2013.01); *H04W 28/0284* (2013.01)

(56) References Cited

U.S. PATENT DOCUMENTS

| | | | | |
|---|---|---|---|---|
| 9,736,510 | B2* | 8/2017 | Frydman | H04N 21/23805 |
| 9,756,142 | B2* | 9/2017 | Dey | H04L 67/2842 |
| 9,872,069 | B1* | 1/2018 | Funk | H04N 21/442 |
| 2009/0125636 | A1* | 5/2009 | Li | H04L 65/4092 709/231 |
| 2009/0285196 | A1 | 11/2009 | Lee et al. | |
| 2011/0066746 | A1* | 3/2011 | Bennett | H04N 21/26616 709/231 |
| 2012/0263120 | A1 | 10/2012 | Gopalakrishnan et al. | |
| 2013/0142319 | A1* | 6/2013 | Lu | H04B 3/32 379/93.08 |
| 2013/0286879 | A1* | 10/2013 | Elarabawy | H04N 21/26208 370/252 |
| 2014/0317241 | A1* | 10/2014 | Zhao | H04L 65/608 709/219 |
| 2014/0344410 | A1* | 11/2014 | Saremi | H04L 65/602 709/219 |
| 2016/0007359 | A1* | 1/2016 | Kim | H04W 28/0205 370/232 |
| 2016/0012856 | A1* | 1/2016 | Cave, Jr. | G11B 27/005 386/241 |

OTHER PUBLICATIONS

Ma, Haiyang et al. "Access point centric scheduling for dash streaming in multirate 802.11 wireless network" IEEE ntemational Conference on Multimedia and Expo (ICME), pp. 1-6, Jul. 14, 2014 consisting of 7-pages.

Tian, Guibain et al. "Towards Agile and Smooth Video Adaptation in Dynamic HTTP Streaming" Emerging Networking Experiments and Technologies, New York, NY Dec. 10, 2012 consisting of 12-pages.

International Search Report and Written Opinion dated Aug. 17, 2015 for International Application Serial No. PCT/SE2014/051234, International Filing Date: Oct. 20, 2014 consisting of 9-pages.

Bjørn J. Villa et al., Title: "Improving Fairness for Adaptive HTTP Video Streaming," DOI: 10.1007/978-3-642-32808-4_17, Publisher: EUNICE, Aug. 2012 consisting of 11-pages.

Te-Yuan Huang et al. Title: "Confused, Timid, and Unstable Picking a Video Streaming Rate is Hard," Boston, Massachusetts, Nov. 14-16, 2012 consisting of 14-pages.

Bjørn J. Villa et al., Title: "Group Based Traffic Shaping Adaptive HTTP Video Streaming," 2013 IEEE 27th International Conference on Advanced Information Networking and Applications (AINA) Conference Location and Date: Barcelona, Spain, Mar. 25-28, 2013 consisting of 8-pages.

Danny De Vleeschauwer et al. Title: "Optimization of HTTP Adaptive Streaming Over Mobile Cellular Networks," 2013 IEEE Proceedings (INFOCOM), Conference Location and Date: Turin, Italy, Apr. 14-19, 2013 consisting of 9-pages.

Harish Viswanathan et al., Title "Mobile Video Optimization at the Base Station: Adaptive guaranteed bit rate for HTTP Adaptive Streaming," Bell Labs Technical Journal, vol. 18(2):159-174, Sep. 2013 consisting of 16-Pages.

Te-Yuan Huang et al., "Downton Abbey Without the Hiccups: Buffer-Based Rate Adaptation for HTTP Video Streaming," Hong Kong, China Aug. 16, 2013 consisting of 6-pages.

Jiasi Chen et al., Title: "A Scheduling Framework for Adaptive Video Delivery over Cellular Networks," ISBN: 978-1-4503-1999-7, MobiCom '13, Proceedings of the 19th Annual International Conference on Mobile Computing & Networking, pp. 389-400, Conference Location and Date: University of Florida, Sep. 30-Oct. 4, 2013 consisting of 12-pages.

3GPP TS 26.247 V12.3.0 (Jun. 2014) 3rd Generation Partnership Project; Technical Specification Group Services and System Aspects; Transparent End-to-End Packet-Switched Streaming Service (PSS); Progressive Download and Dynamic Adaptive Streaming over HTTP (3GP-DASH) (Release 12) Jun. 27, 2014 consisting of 118-pages.

Wang Min et al., "Optimization of Fairness for HTTP Adaptive Streaming with Network Assistance in LTE Mobile Systems," 2014 IEEE 80th Conference on Vehicular Technology (VTC Fall), Location and Date: Vancouver, BC, Canada, Sep. 14-17, 2014 consisting of 5-pages.

Jan Lievens et al., "Optimized segmentation of H.264/AVC video for HTTP adaptive streaming," 2013 IFIP/IEEE International Symposium, Location and Date: Ghent, Belgium May 27-31, 2013 consisting of 6-pages.

Tomas Kupka et al., "Performance of on-off traffic stemming from live adaptive segmented HTTP video streaming," 2012 IEEE 37th Conference, Location and Date: Clearwater, Florida Oct. 22, 2012, consisting of 9-pages.

Sergio Cicalo, et al., "Quality-fair HTTP adaptive streaming over LTE network," 2014 IEEE International Conference on Acoustics, Speech and Signal Processing (ICASSP), May 4, 2014 consisting of 5-pages.

* cited by examiner

NETWORK NODE AND METHOD FOR HANDLING A PROCESS OF CONTROLLING A DATA TRANSFER RELATED TO VIDEO DATA OF A VIDEO STREAMING SERVICE

CROSS-REFERENCE TO RELATED APPLICATIONS

This application is a Submission Under 35 U.S.C. § 371 for U.S. National Stage Patent Application of International Application Number: PCT/SE2014/051234, filed Oct. 20, 2014 entitled "NETWORK NODE AND METHOD FOR HANDLING A PROCESS OF CONTROLLING A DATA TRANSFER RELATED TO VIDEO DATA OF A VIDEO STREAMING SERVICE," the entirety of which is incorporated herein by reference.

TECHNICAL FIELD

Embodiments herein relate to a network node and a method therein. In particular, it relates to handling a process of controlling a data transfer related to video data of a video streaming service from a server to a wireless device.

BACKGROUND

Wireless devices for communication such as terminals are also known as e.g. User Equipments (UE), mobile terminals, wireless terminals and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server, such as server providing video streaming service, via a Radio Access Network (RAN) and possibly one or more core networks, comprised within the cellular communications network.

Wireless devices may further be referred to as mobile telephones, cellular telephones, computers, or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

A cellular communications network covers a geographical area which is divided into cell areas, wherein each cell area being served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations also referred to as transmitter-receiver pairs. In the context of this disclosure, the expression Downlink (DL) is used for the transmission path from the base station to a wireless device. The expression Uplink (UL) is used for the transmission path in the opposite direction i.e. from the wireless device to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE is controlled by the radio base station.

Dynamic Adaptive Streaming over HTTP (DASH), also known as Moving Picture Experts Group (MPEG)-DASH, has been adopted by 3GPP targeting to unify behaviors of different adaptive streaming video services and vendors. HTTP is the abbreviation for Hypertext Transfer Protocol. A general mobile network media flow of DASH, or any other HTTP Adaptive Streaming (HAS) video solution in a mobile network is exemplified in FIG. 1. The video server may be incorporated in normal web servers with storage of video representation with different codec rates. The client e.g. in a wireless device sends a first video request with an initial rate, typically a low rate to a video server, followed by a bundle of video frames comprising video data transmitted from the media server also referred to as a video server. The bundle of video frames, also called video segment, is composed of the subsequent frames in an interval of several seconds.

It is typically the client that performs the bit rate adaptation to match an estimated available network bandwidth also sometimes referred to as estimated throughput. The client bit rate adaptation has the benefit that the client may directly keep track of the variation of the downloading rate and the playback buffer. The rate adaptation may be triggered for each video segment hence the size of the video segments influences the frequency of the rate adaptation. A requested video clip starts to play when a given level of the playback buffer is filled. The playback is frozen if the buffer is underrun, i.e. empty, and re-started when enough pending video is received this is referred to as re-buffering.

A utility maximization problem that separately takes into account different utility functions for HAS video and data flows have been discussed. This showed that the utility maximization may be achieved through an algorithm, Adaptive Guaranteed Bit Rate (AGBR), wherein target bit rates are calculated for each HAS flow and passed on to an underlying minimum rate proportional fair scheduler that schedules resources across all the flows.

In "Improving Fairness for Adaptive http video Streaming" by B. Villa et al, an analysis of a suggested method for improving fairness among competing adaptive video streams is provided. The metrics used as fairness indicators are differences in achieved average rate and stability among the competing streams. The method analyzed is based on changing a fixed and equal video segment request rate (T) of each stream, to either a per session unique or random request rate.

This scheme is helpful for distributing to video users in time by having different segment request rates, and therefore may give a positive impact on the utilization of a link, and help the video users. However, it does not work so well in high load situations.

Streaming video over mobile networks, such as LTE, is increasing and more content providers are appearing on the market. Dynamic Adaptive Streaming over HTTP is one standardized solution for providing rate adaptive video streaming. One problem that users watching video are experience is buffer underrun which causes the video playback to freeze. Another problem is that the streaming video users are taking too much of the shared resources from other data applications, i.e. there is an unfair situation that may occur. This depends on the type of congestion control algorithms in the streaming video and the other data servers, and how the transmission network is configured to treat the different flows.

Network assisted rate adaptation, may optimize the issue of fairness between the video clients and between video and other traffic, especially in the RAN, which has been observed in existing research activities. However, the improved rate adaptation can only operate in the typical time unit of seconds, depending on the size of the video bundle which includes a couple of consecutive video frames, which are also called video segment or video chunks. The radio schedulers in $3^{rd}$ Generation (3G) and 4th Generation (4G) mobile systems operate on a few milliseconds basis with, in case of a proportional fair scheduler, typically a fairness consideration based on transmitted bits and channel quality in the order of a few seconds. These two functions separately only solve parts of the problems of buffer underrun and unfairness.

An update frequency of the target bit rate is dependent on the playback time that the video segment consist of as it is the video client that request a new segment and the state of the art clients request the new segment when one or several segments has been played. This gives the characteristics of the pending video as in FIG. 2 where a request is triggered when the pending video in the play-out buffer is 30 s. FIG. 2 depicts an example of amount of pending video in the play-out buffer with respect to time.

SUMMARY

It is therefore an object of embodiments herein to provide a way of improving the performance in a wireless communications network using video streaming service.

According to a first aspect of embodiments herein, the object is achieved by a method in a network node relating to a process of controlling a data transfer related to video data of a video streaming service from a server to a wireless device. The network node and wireless device operates in a wireless communications network.

The network node determines a scheduling weight value for the wireless device to be used in the data transfer, based on a target rate scheduling weight value. The network node then determines a size of data segment to be used in the data transfer based on at least part of the scheduling weight value. The network node further determines a pending data volume for the transferring of the video data to a play back buffer of the wireless device based on at least part of the scheduling weight value.

According to a second aspect of embodiments herein, the object is achieved by a network node relating to a process of controlling a data transfer related to video data of a video streaming service from a server to a wireless device. The network node and wireless device are arranged to operate in a wireless communications network. The network node is arranged to perform the process of controlling of data transfer by being configured to:

Determine a scheduling weight value for the wireless device to be used in the data transfer, based on a target rate scheduling weight value Determine a size of data segment to be used in the data transfer based on at least part of the scheduling weight value, and Determine a pending data volume for the transferring of the video data to a play back buffer of the wireless device based on at least part of the scheduling weight value.

An advantage with embodiments herein is that a good balance between efficient system resource utilization, UE coverage improvement, UE user bit rate and QoE is achieved.

A further advantage with embodiments herein is that they provide efficiently and improve fairness by considering the network operational efficiency and the mitigating the effect of fast fading of the radio channel quality in the RAN.

A further advantage with embodiments herein is that they provide a complete control process for controlling the HAS video client and the transmission of data to particular users based on parameters and functions that the radio access network is actually using to decide to which users it will send data to in the next transmission time interval and/or occasion

BRIEF DESCRIPTION OF THE DRAWINGS

Examples of embodiments herein are described in more detail with reference to attached drawings in which.

DETAILED DESCRIPTION

Embodiments herein relate to handling a process of controlling a data transfer related to video data of a video streaming service from a server to a wireless device, Embodiments herein provides a solution that combines the characteristics of HAS services, e.g. client behavior, and RAN, and may comprise four control units, outer- and inner rate control loops, segment size control and pending video control, which may all be connected to existing RAN control functionality.

Figure 1:
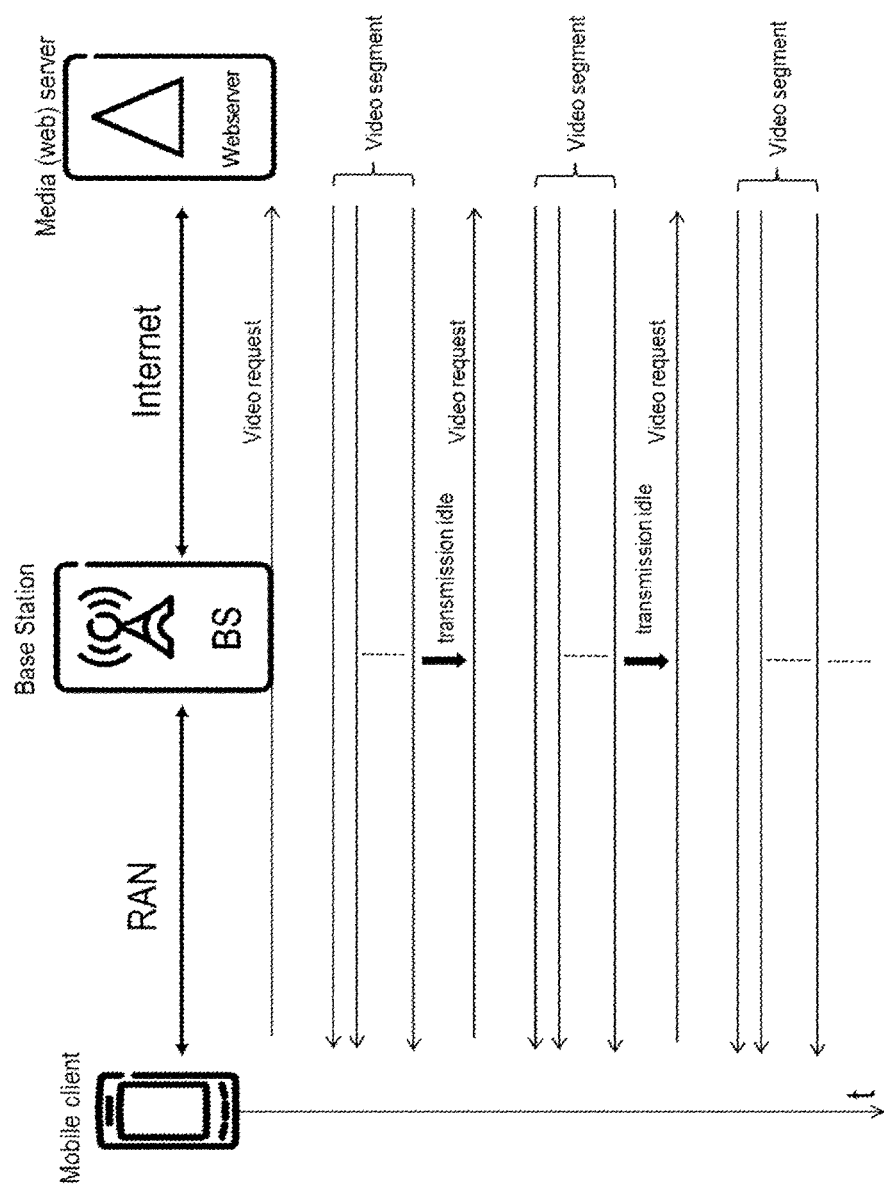
FIG. 1 is a schematic block diagram illustrating a HAS video in a mobile network according to prior art.
Figure 2:
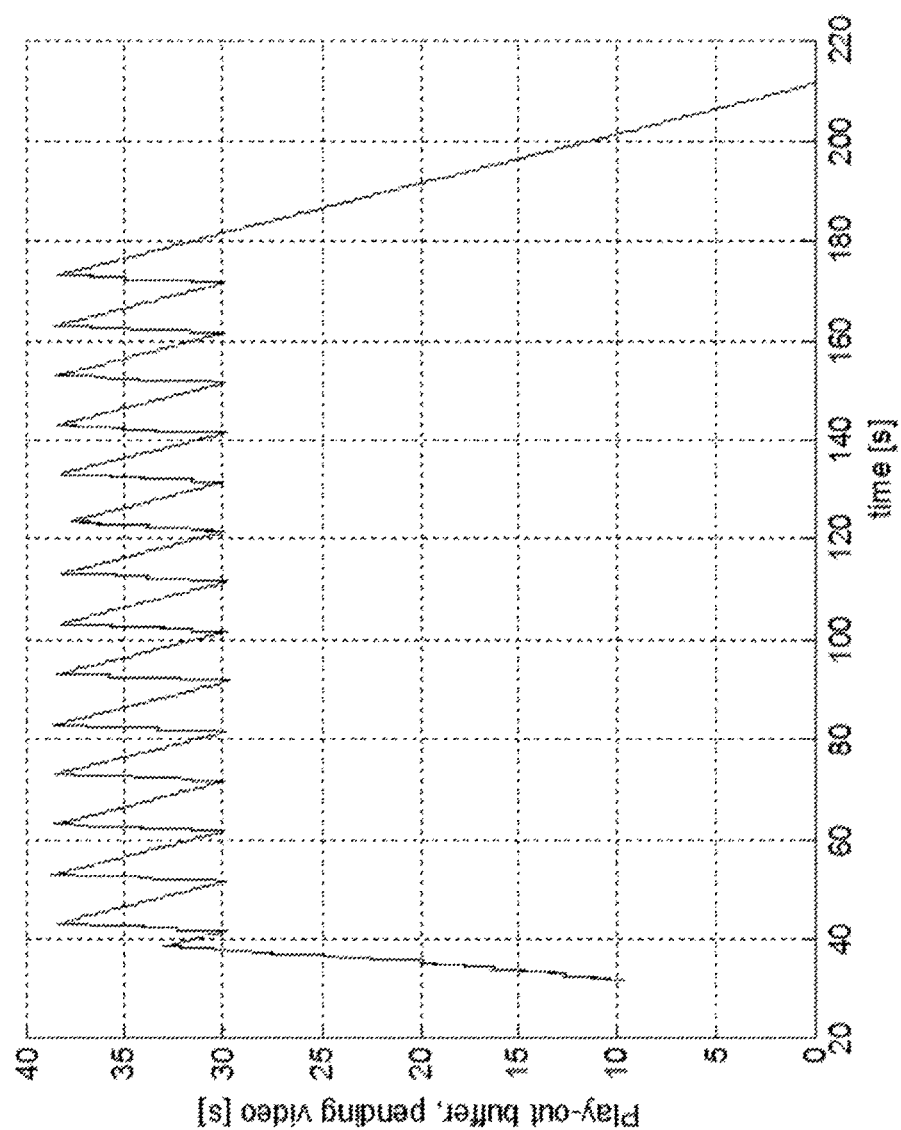
FIG. 2 is a diagram illustrating amount of pending video in a play-out buffer according to prior art.
Figure 3:
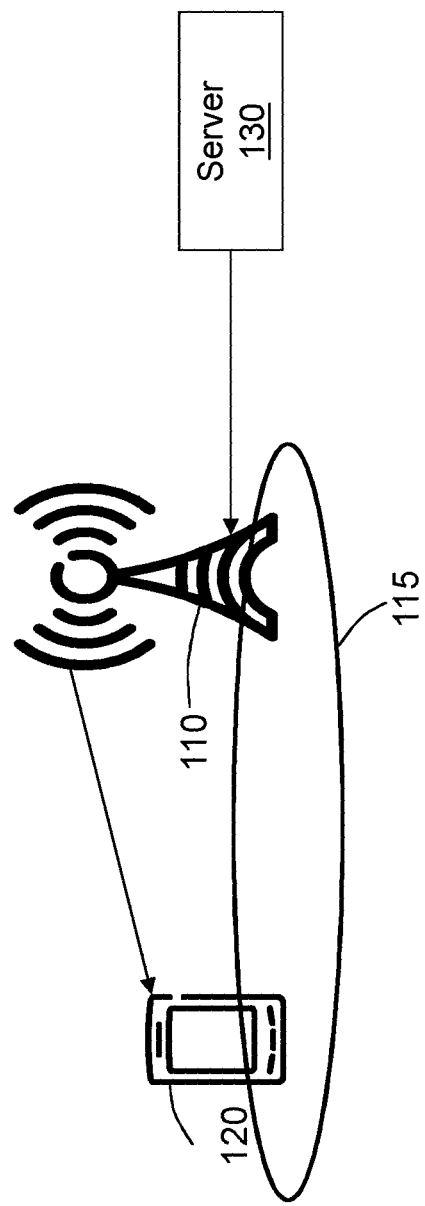
FIG. 3 is a schematic block diagram illustrating a wireless communications network.

FIG. 3 depicts a wireless communications network 100 in which embodiments herein may be implemented. The wireless communications network 100 is a radio network such as an LTE, a WCDMA, a Wimax, WiFi, Wireless Local Area Network (WLAN) or any radio network or system.

A plurality of network nodes operates in the wireless communications network 100, whereof only one, a network node 110, is depicted in FIG. 3 for simplicity. The network node 110 may be referred to as a transmission point and may in some embodiments be a base station referred to as, eNodeB (eNB), NodeB, B node, Base Transceiver Station (BTS), AP (Access Point) or a Home Node B, a Home eNodeB depending on the technology and terminology used, or any other network node capable to communicate with a wireless device with wireless capability, or any other radio network unit capable to communicate over a radio link in a wireless communications network. The network node 110 serves a cell 115.

A number of wireless devices operate in the wireless communications network 100. In the example scenario of FIG. 3, only one wireless device is shown for simplicity, a wireless device 120 which is located in the cell 115 served by the network node 110. The wireless device 120 may e.g. be a mobile wireless terminal, a mobile phone, a computer such as e.g. a laptop, or tablet computer, sometimes referred to as a surf plate, with wireless capabilities, or any other radio network unit capable to communicate over a radio link in a wireless communications network. Please note the term wireless device used in this document also covers other wireless terminals such as Machine to Machine (M2M) devices.

The wireless communications network 100 has access to a server 130. The wireless device 120 has access to the server 130 e.g. via the internet. The server 130 provides video streaming service to the wireless device 120. The server 130 may e.g. be a webserver or media server or any server capable of providing video streaming service to the wireless device 120.

Embodiments herein relates to a process of controlling a data transfer related to video data of a video streaming service from the server 130 to the wireless device 120. The embodiments may be referred to as a two layered based rate control of the data transfer of the video streaming service, coupled together with a control of segment size selection for the data transfer and amount of pending video in a client buffer of the wireless device 120.

The rate control of the data transfer may comprise an outer loop which sets the target rate, and an inner loop, which will achieve the target. The outer loop rate control is based on network assistance provided information, which targets to maintain the video bit rate at a certain target considering the wireless network operation efficiency, e.g. fairness between wireless devices during a given period. This rate is referred to as the target bit rate. This control loop is slower compared to the inner loop rate control. The inner loop rate control operates based on target bit rate, and it will adjust a scheduler weight priority value in order so that the achieved received rate of a client is the targeted bit rate.

The segment size control, is based on filtered values of the number of wireless devices connected to the network node 110, signaling load in the cell 115 and energy efficiency, which energy efficiency relates to how often and for how long time the radio has to be active in the wireless device 120 and the network node 110. In some embodiments wherein multiple tables of segment sizes are available, these three inputs are used to choice among tables of segment sizes. When only one table is available or when a table is selected the proportional fair rate scheduling weight and the target rate scheduling weight may be combined in a selection function that indicates the segment size to be used by the wireless device 120 for video streaming such as HAS.

The pending video control indication is based similar to the segment size increase; first the target bitrate must be higher than that of a given video bitrate, then a decision function to download the video data in a higher pace, i.e. deciding the pending data volume for the transferring, is based on the two scheduling weights. Pending here means how much video that is waiting in the video client playback buffer and is ready to be played.

Hence, in summary embodiments herein provides a process for controlling data transfers related to video data of video streaming services from a server to a wireless devices, such as a HAS video client and the transmission of data to particular wireless devises when HAS video users of the wireless devices are present in the given part of the system. The given part of the system here means the particular cell in the cellular system such as the wireless communications network 100.

Embodiments herein will first be described in a general manner. After, a more detailed description and explanation will follow.

Figure 4:
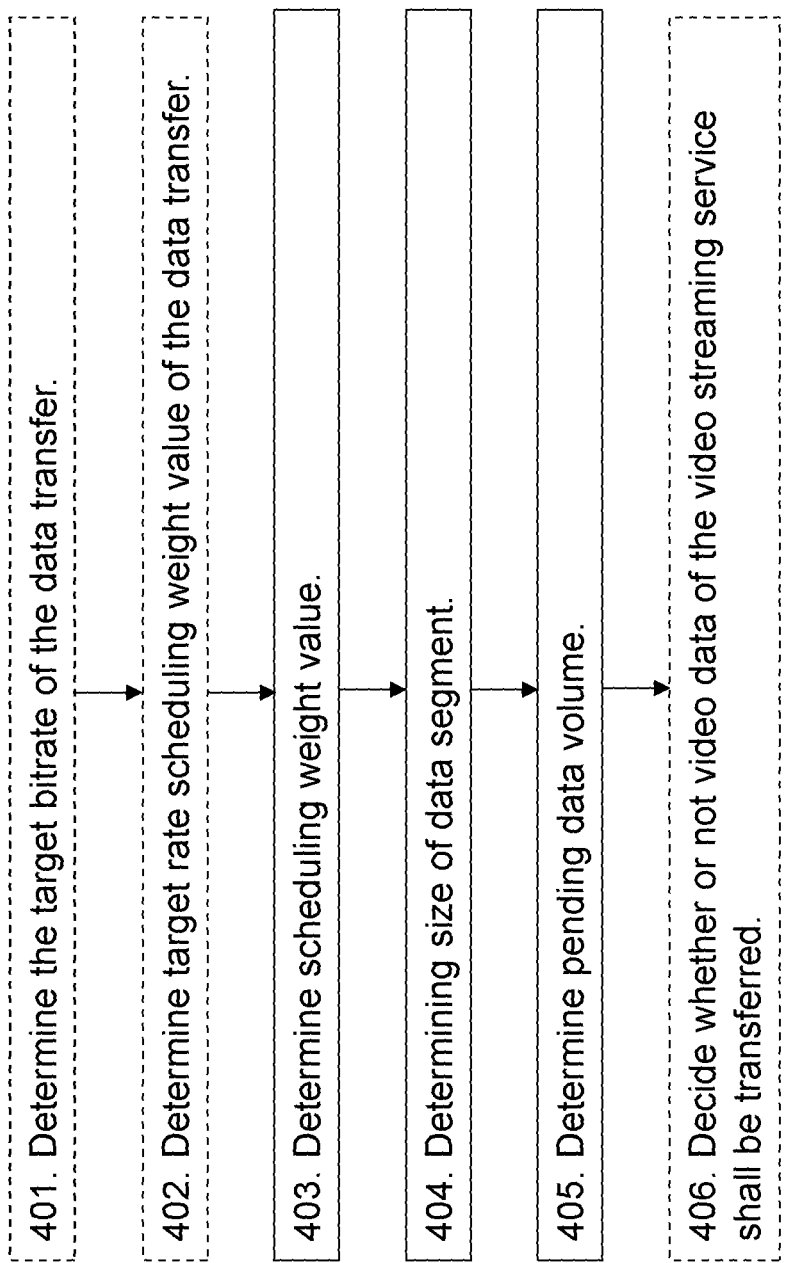
FIG. 4 is a flowchart depicting embodiments of a method in a network node.

Example embodiments of a method in the network node 110 relating to a process of controlling a data transfer related to video data of a video streaming service from the server 130 to the wireless device 120, will now be described with reference to a flowchart depicted in FIG. 4. As mentioned above, the network node 110 and the wireless device 120 operate in a wireless communications network 100.

The process of controlling of data transfer comprises the following actions, which actions may be taken in any suitable order. Dashed lines of some boxes in FIG. 4 indicate that this action is not mandatory. In an example scenario, the network node 110 detects that the wireless device 120 has started a video streaming service from the server 130. This may be performed by direct signalling from a video client in the wireless device 120 or video server, such as the server 130, to the network node 110, or implicitly by detecting traffic on a particular access bearer that may only carry this type of video streaming traffic. Note that there are also other ways such as e.g. deep packet inspection.

Action 401

According to embodiments herein, scheduling weight value calculations includes a target rate scheduling weight value to control the data transfer related to the video streaming service, which scheduling weight value takes as input the target bitrate and therefore the target bit rate need to be determined. Thus the network node 110 may determine the target bitrate of the data transfer based on network operational efficiency of the wireless communications network 100. E.g. cell throughput, resource block utilization and how many users that is above or a given quality of service, such as object throughput, and are hence recognized as happy users, are examples of network operational efficiency In some embodiments, the determining of the target bitrate of the data transfer is further based on transmission delay of part of or one or more video frames of the data transfer.

Action 402

As mentioned above, the network node 110 determines the target rate scheduling weight value of the data transfer, based on the target bitrate of the data transfer.

Action 403

The network node 110 then determines a scheduling weight value for the wireless device 120 to be used in the data transfer. The decision is based on a target rate scheduling weight value. The decision of the scheduling weight value may further be based on a proportional fair rate scheduling weight value.

Proportional fair rate scheduling weight value is often the ratio between the potential rate of the wireless device based on current channel conditions and the recent received rate the wireless device has had.

There may be more parameters such as subscriber type that may be used to base the decision of the scheduling weight value.

In some embodiments, the scheduler weight value is determined such that the achieved received bit rate of the wireless device 120 is the targeted bit rate of the data transfer. This is advantageous since guarantees to a user on minimum received rate may then be given.

Action 404

In the process of controlling the data transfer of the video data the size of the data segments need to be determined as this affects how often the video rate can be adapted to changing link conditions. This function takes e.g. as input the scheduling weight value and the output indicates whether the current data segment size should be kept or if it should be decrease or increased compared to the current segment size. This may be performed by the network node 110 determining the size of data segment to be used in the data transfer based on at least part of the scheduling weight value.

The determining of the size of data segment may be performed by using a table of sizes of data segments based on at least one load measure of the wireless communications network 100. The size of the data segment to be used for the data transfer is then determined from the used table of sizes of data segments based on at least part of the scheduling weight value. In some embodiments multiple table of sizes of data segments are available. In these embodiments, the network node 110 first selects a table of sizes of data segments among the multiple of sizes of data segments. This selection may e.g. be based on the number of wireless devices connected to the network node 110, signalling load in the cell 115 of the network node 110, and energy efficiency in the wireless device 120 and/or the network node 110.

In some embodiments the determining of the size of data segment to be used in the data transfer further is based on at least one load measure of the wireless communications network 100. One load measure is the energy efficiency, with smaller segments the wireless device's '120 radio will be more active as it does not may go to a less active radio state, i.e. the radio modem will not be turned off, and hence consumes more energy.

Action 405

In the process of controlling the data transfer of the video data, also the pending data volume needs to be determined. That is whether the wireless communications network 100 is in such a situation that it may support an increased amount of pending video in the play-back buffer of the wireless device 120, i.e. download video data in a pace higher than what is consumed by the wireless device 120. According to embodiments herein the pending data volume takes as input the scheduling weight value. The network node 110 thus determines a pending data volume for the transferring of the video data to a play back buffer of the wireless device 120 based on at least part of the scheduling weight value.

The determining of the pending data volume for the transferring of the video data to a play back buffer of the wireless device 120 may further be based on that the pace of transferring the video data to the play back buffer of the wireless device 120 shall be higher than what is consumed by the wireless device 120. If the rate requested is already high, this additional input likely means that the wireless device 120 is having good link conditions and hence, the increase of pending data volume in the playback buffer has a minor impact on other wireless devices as the system is probably not fully utilized.

Action 406

The network node 110 may further decide whether or not the video data of the video streaming service shall be transferred from the server 130 via the network node 110 to the wireless device 120 based on the scheduling weight value. The radio access network such as the wireless communications network 100 will transmit to the wireless device (s) with the highest scheduling weight value per transmission time interval, as the functions that have calculated the value considers the given criteria for which wireless device to transmit to.

Embodiment's herein will now be described more in detail. The text below is applicable to and may be combined with any suitable embodiment described above.

As mentioned above, embodiments herein may comprise four control units, outer- and inner rate control loops, segment size control and pending video control, which may all be connected to existing RAN control functionality. FIGS. 5 to 11 provide overviews of the connections, and a detailed description of the embodiments is given in relation to each figure.

Inner Loop Target Rate Control

Figure 5:
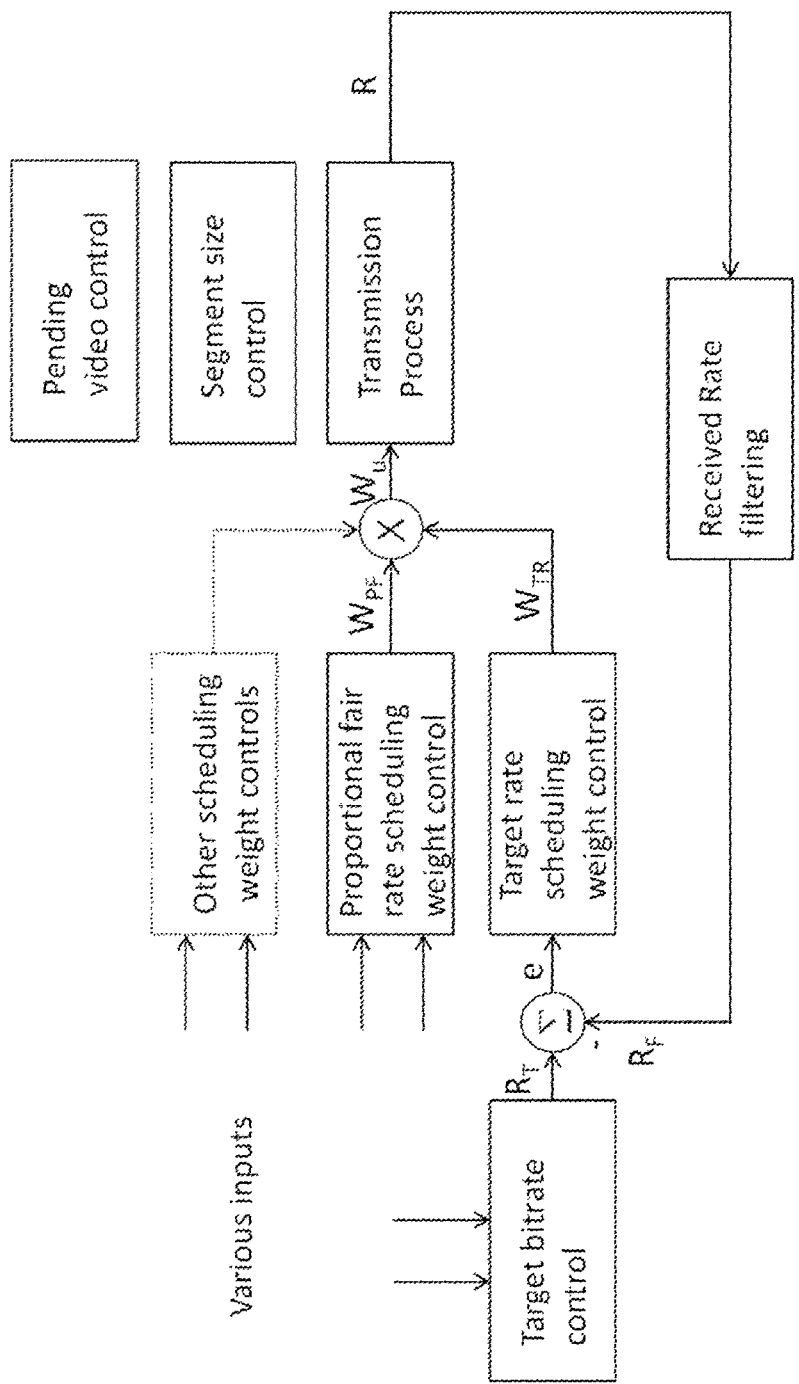
FIG. 5 is a schematic block diagram illustrating embodiments of a wireless communications network.
Figure 6:
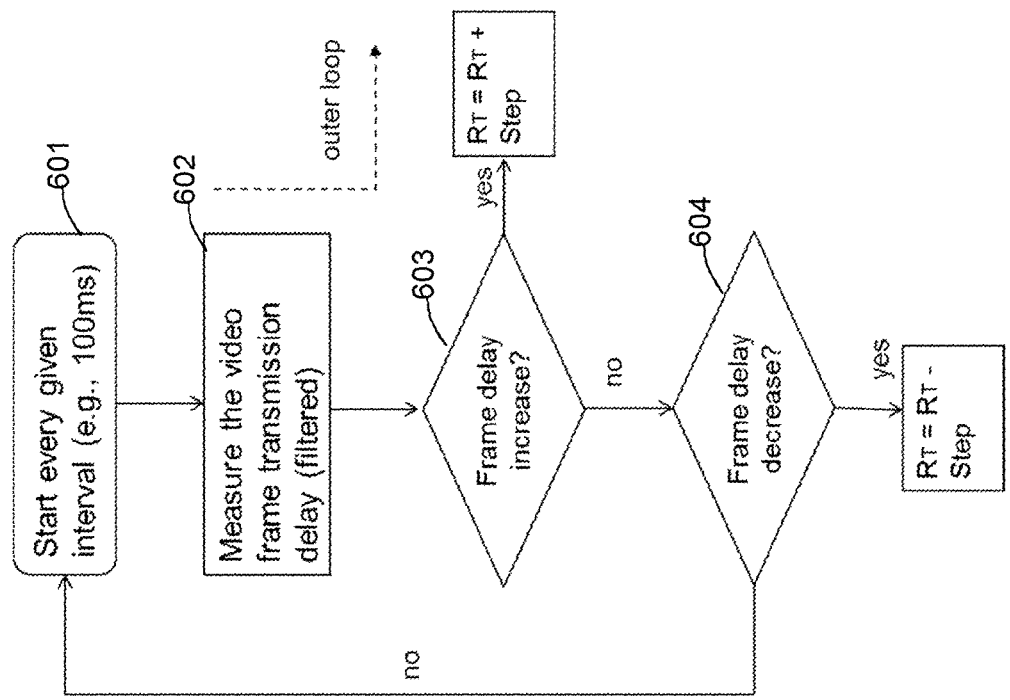
FIG. 6 is a flowchart depicting embodiments in a wireless communications network.

FIG. 5. depicts an example of an overview of scheduling weight calculation connections according to embodiments herein.

As seen in FIG. 5 the scheduling weight value calculation according to embodiments herein which is determined in Action 403 comprises a target rate scheduling weight value determined in Action 402, which takes as input the target bitrate determined in Action 401 and in some of the embodiments also the actual received bitrate of the wireless device 120. In this example, the target rate scheduling weight control is performed based on an error of the received bitrate in the wireless device 120 and the target bitrate. The target rate scheduling weight control may for example be performed using a Proportional-Integral controller (PI), or for example by a step function. A proportional fair rate scheduling weight control may be the ratio between the potential rate of the wireless device 120 based on current channel conditions, e.g. CQI measurements and the recent received rate the wireless device 120 had. The target rate scheduling weight value is e.g. combined with the proportional fair rate scheduling weight value to form the final scheduling weight value of the wireless device 120 that may be subject for data transmission in the next transmission time interval of the system. It is assumed here that the higher scheduling weight value the better chance that this particular wireless device 120 will be scheduled in the next transmission time interval.

The network operational efficiency may be reflected in terms of the system load, the video capacity, i.e., the maximum number of the satisfactory video users that the system can serve, the downloading rate of the competing Best Effort (BE) traffic, the system fairness metric which for example may be the equal bit rate/resource share between the video clients, the user subscription or the data traffic quality of service characteristics, for example QoS Class Indicator (QCI), etc. The network operational efficiency may be used in the algorithm of the target bitrate control which uses then for example number of connected wireless devises, their traffic type, resource consumption etc., to calculate a wireless device's target bitrate.

As mentioned the target rate scheduling weight control may be performed with a PI controller that will minimize the error (e), between the target bitrate ($R_T$) and the filtered received bitrate ($R_F$). This gives the discrete expression of the k:th $W_{TR}$. Wherein $W_{TR}$ is the Target Rate scheduling weight value.

$$W_{TR\_k} = W_{TR\_k-1} + K_p[(1+\Delta/T_i)e_k - e_{k-1}],$$

where $K_p$, and $T_i$ are the PI controller parameters and $\Delta$ is the sampling period. The sampling period is in the order of transmission time interval, e.g. 1 ms.

The received rate filtering may be a sliding window with a smoothed average over e.g. the last second.

The target bitrate (RT) may also be communicated to the video client or video server so that the target bitrate is applied directly to the source.

Adjustment of Outer Loop Rate Control

This is related to Action 401 above and is an additional adjustment of the outer loop rate control. According to some embodiments, an additional jump based inner rate control is provided. This additional inner loop rate control monitors the status of the video data transfer, exemplified in a flow chart in FIG. 6. The video streaming service such as e.g. the HAS video is sensitive to the buffer under-run, which may be mainly due to the unsmoothed or abrupt video data transmission in the wireless communications network 100. The playing of the video is frozen when the wireless device 120, also related to as a client in the wireless device 120, experiences buffer under-run. This means that video data arrives too late and therefore cannot be played in time. Hence, the video data transfer delay in the wireless communications network 100 is one important metric to reflect the actual quality of experience. The additional jump scheme operates in terms of a measurement of the video data transfer delay such as e.g. a video frame transmission delay, which video frame comprises part of the video data. The video data transfer delay may comprise two parts. One is a queuing delay in the RBS buffer of the network node 110, and the other is an actual transmission delay. A filter may be applied here to smooth the variation of the measured video frame transmission delay. The jump based inner loop rate control is e.g. performed by the following actions:

Action 601. The network node 110 starts measuring the video frame transmission delay every given interval such as e.g. each 100 ms.

Action 602. The network node 110 measures the video frame transmission delay.

Action 603. The network node 110 checks whether the video frame transmission delay shall increase. If yes the $R_T = R_T +$ one step, wherein $R_T$ is the target bit rate. If no, go to Action 604.

Action 604. The network node 110 checks whether the video frame transmission delay shall decrease. If yes the $R_T = R_T -$ one step. If no, go to Action 601.

Figure 7:
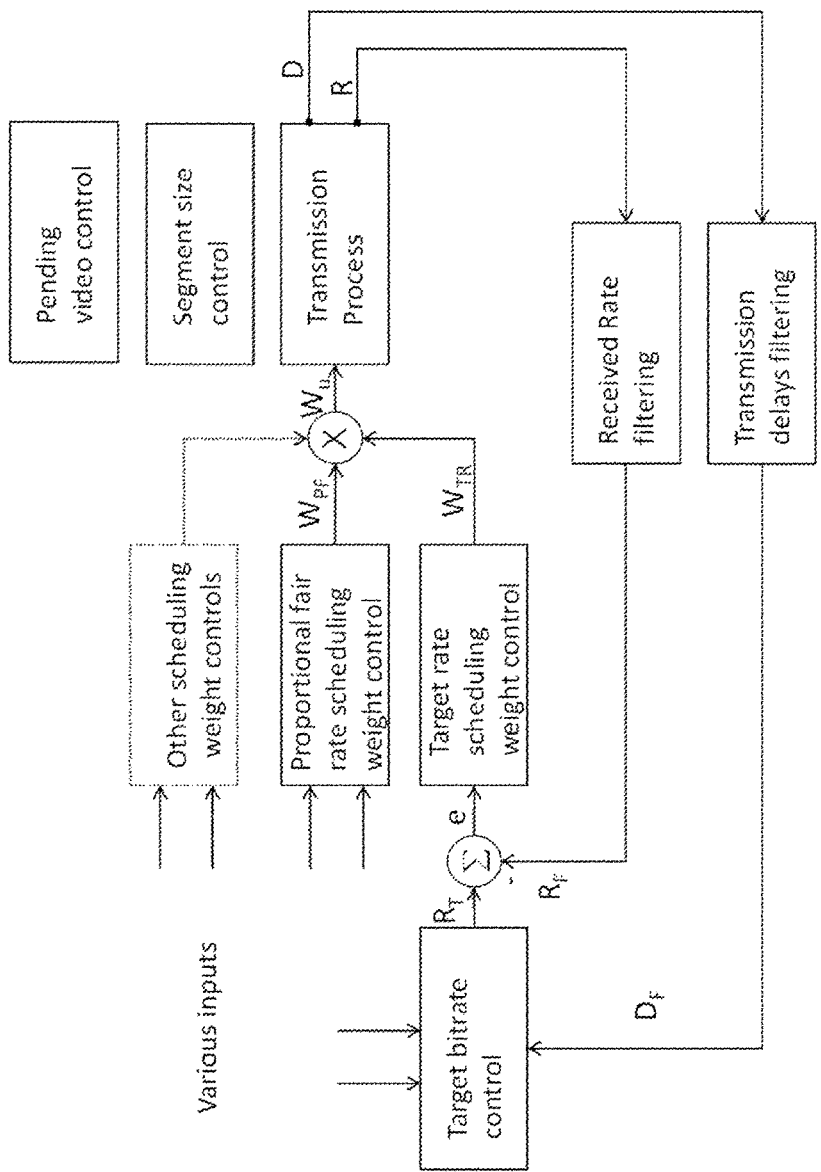
FIG. 7 is a schematic block diagram illustrating embodiments of a wireless communications network.

In these embodiments, the scheme in FIG. 5 is extended with transmission delays filtering according to FIG. 7.

In additional, the maximum and minimum target bit rate may be introduced in this jump scheme in order to make sure the rate change is within the reasonable range. A masking function may be also added, so that repeated target bit rate is avoided, and the tuning of the rate target is disabled during a given period since the last the rate change.

Segment Size Control

Figure 8:
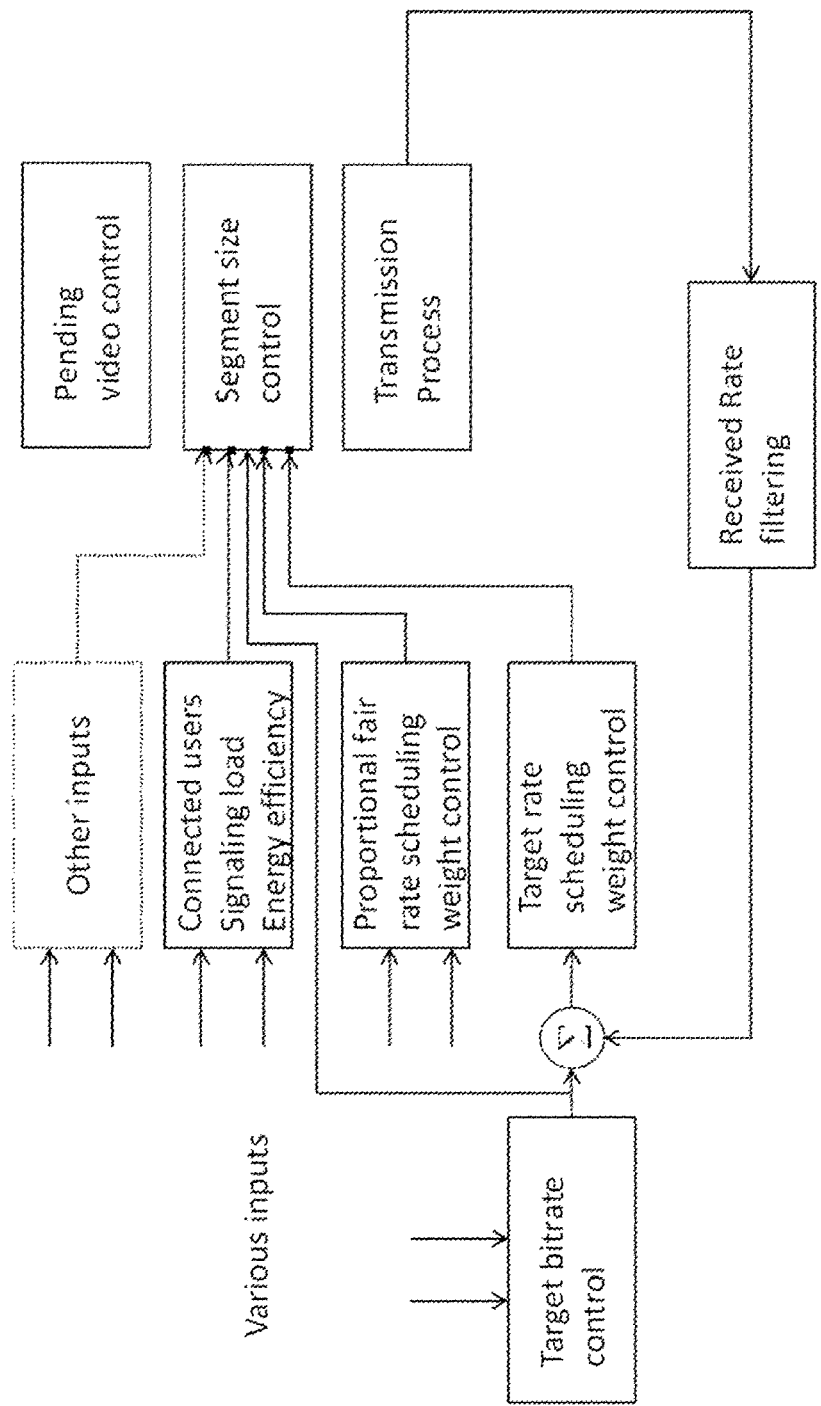
FIG. 8 is a schematic block diagram illustrating embodiments of a wireless communications network.

FIG. 8 depicts an overview of the segment size control connections. This relates to Action 404 described above.

The segment size control, is e.g. based on filtered values of any one or more out of the number of wireless devises connected to the network node 110, signaling load and energy efficiency in the wireless device 120 and the cell 115 served by the network node 110. Those three inputs may be used to choose among any tables of segment sizes available. When the network node 110 has selected a table of segment sizes, the target rate scheduling weight which may be combined with the proportional fair rate scheduling weight value in a selection in the table of segment sizes indicating the segment size to be used in the data transfer such as e.g. to be uses by a HAS video user. The target rate scheduling weight value may be a part of the scheduling weight value. The selection function may takes as input the two scheduling weight values and the output indicates whether the current segment should be kept or if it should be decrease or increased compared to the current segment size. The selection function may be a simple summary function compared to threshold values, or a more advance filtering functions or even a controller. However, before the segment size is set higher than that of the lowest supported segment size, e.g. 1s, the target bitrate must be higher than that of a given video bitrate.

An advantageously rule of changing for the segment size is that if the proportional fair rate scheduling weight value is relative high and/or increasing, and the target rate scheduling weight value is low then the segment size should be increasing or be kept. Similar if the target rate scheduling weight value is increasing and the proportional fair rate scheduling weight value is stable or decreasing the segment size should be reduced.

Figure 9:
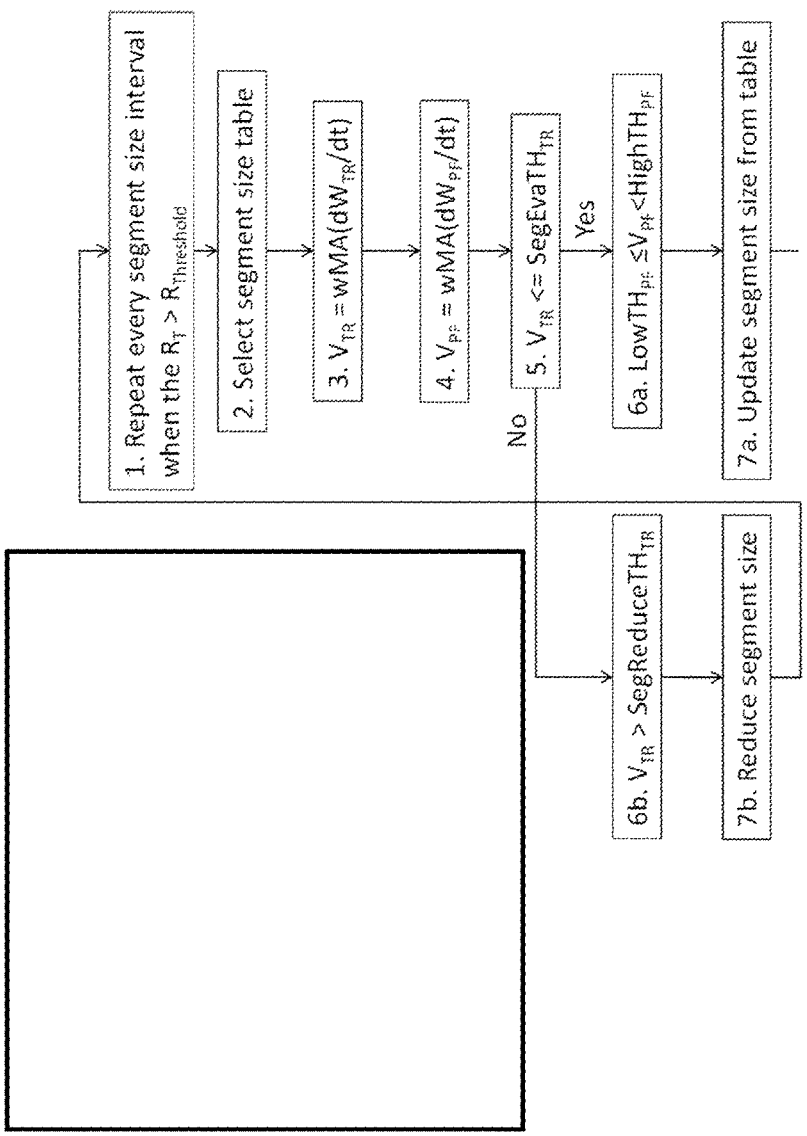
FIG. 9 is a flowchart depicting embodiments in a wireless communications network.

FIG. 9 depicts a flow chart related to an example of how a segment size selection process may be performed.

Action 1 of FIG. 9. The process is repeated according to the current segment size interval.

Action 2 of FIG. 9. A segment size table is selected. The table gives threshold values Low $TH_{FP}$ and High $TH_{FP}$ which indicates the range where a segment size is valid.

Action 3 of FIG. 9. A weighted moving average of the target bit rate scheduling weight value, $V_{TR}$, rate is calculated, is.

Action 4 of FIG. 9. The weighted moving average of the proportional fair scheduling weight value, $V_{PF}$.

Action 5 of FIG. 9. When the weighted moving average of the target rate scheduling weight value $V_{TR}$ is less than or equal to the segment evaluation threshold, the target rate is met and it may be useful to update the segmental size.

Action 6. a) of FIG. 9. The value of the weighted moving average of the proportional fair scheduling weight value, $V_{PF}$, fits into the range given by Low $TH_{FP}$ and High $TH_{FP}$, which corresponds to a segment size.

Action 6. b) of FIG. 9 If the weighted moving average of the scheduling weight value $V_{TR}$ is larger than the segment evaluation reduce threshold, the target rate is not met and it may be useful to reduce the segment size one step, i.e. use the next smaller segment size in the table.

Action 7. a) of FIG. 9. The segment size is updated according to the chosen table of sizes, and enforced or recommended to the client such as the wireless device 120 and/or the server such as the server 130.

Action 7. b) of FIG. 9. The segment size is updated by being reduced, and enforced or recommended to the client such as the wireless device 120 and/or the server such as the server 130.

A rule of thumb is based on the relation that if the target rate scheduling weight value is increasing, then the target bitrate is hard to maintain, and similar if the proportional fair rate scheduling weight value is decreasing the channel quality is worsen, and hence it is likely better to have the possibility to alter the target bitrate more often, hence a smaller segment size is preferred as that gives how often the video rate can be changed as explained above.

Pending Video Control

Figure 10:
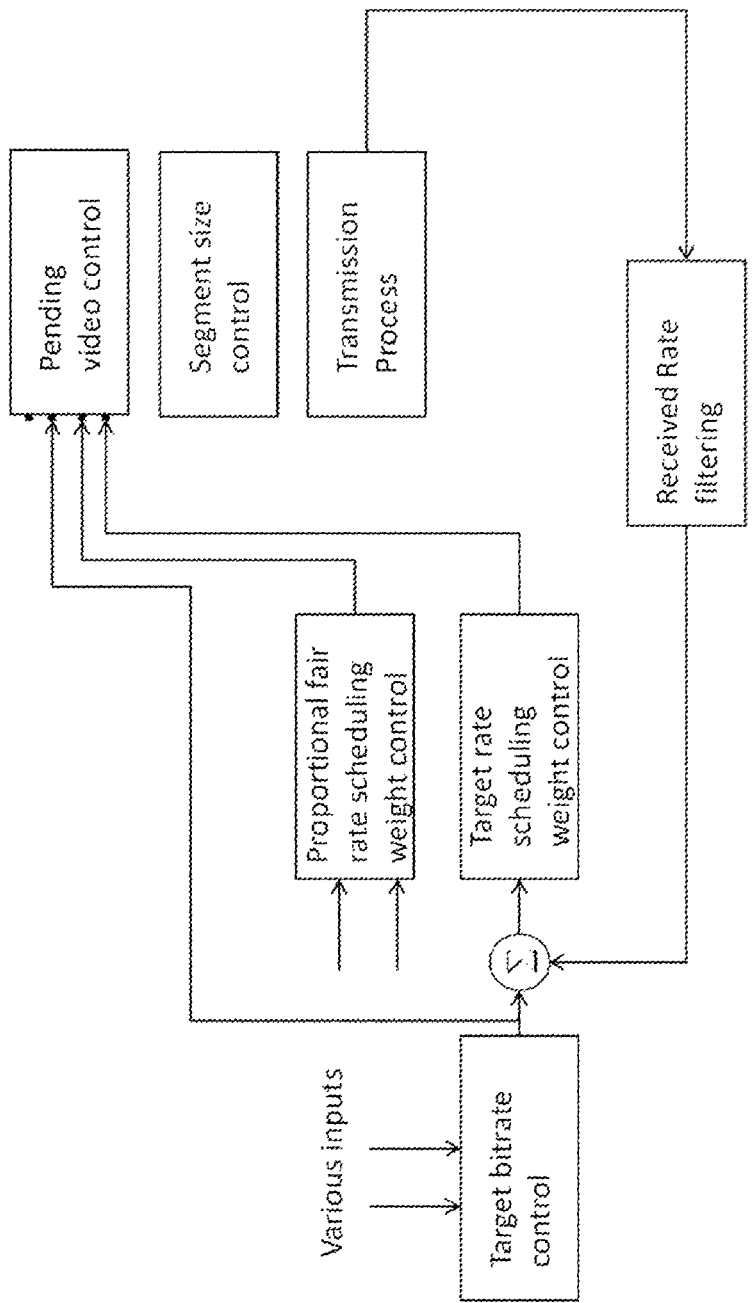
FIG. 10 is a schematic block diagram illustrating embodiments of a wireless communications network.

FIG. 10 depicts an overview of the pending video control connections according to an example embodiment. This relates to Action 405 described above.

The pending video control indicates to the wireless device 120 such as e.g. a HAS video client within the wireless device 120, whether the wireless communications network 100 is in such a situation that it may support an increased amount of pending video data in the play-back buffer of the wireless device 120, i.e. download video data in a pace higher than what is consumed by the wireless device 120 or the client in the wireless device 120.

The pending video control indication is based similar to the segment size increase; first the target bitrate of the data transfer shall be higher than that of a given video bitrate, then a decision function to download video data in a higher or lower pace is based on the two scheduling weights, see FIG. 10.

Figure 11:
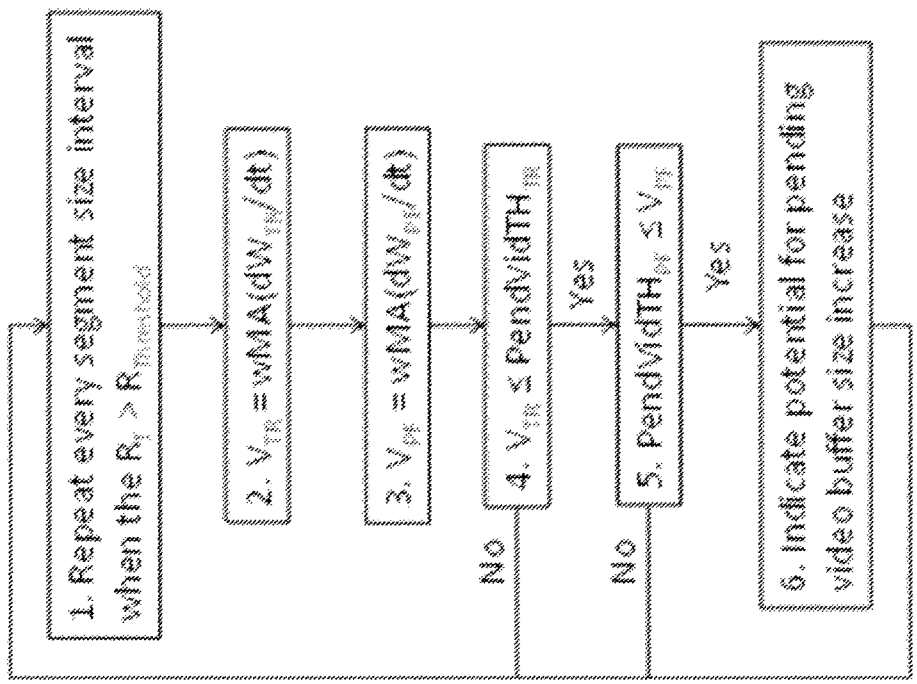
FIG. 11 is a flowchart depicting embodiments in a wireless communications network.

The network node 110 determines a pending data volume for the transferring of the video data to the play back buffer of the wireless device 120. A decision of the function is that when the proportional fair rate scheduling weight value is relative high and/or increasing and the target rate scheduling weight is low then the decision is to indicate to the wireless device 120 or its client to download in a higher pace to increase the pending video in the play-back buffer of the wireless device an example of the process of pending video control in FIG. 11. The process may comprise the following actions:

Action 1 of FIG. 11. The process is repeated according to a current segment size interval when the target bit rate $R_T$ is above a given bit rate threshold $R_{threshold}$. Note that the $R_{threshold}$ may be set close to the highest supported video rate by the server 130.

Action 2 of FIG. 11. The weighted moving average of the scheduling weight value of the target rate $V_{TR}$ is calculated.

Action 3 of FIG. 11. The weighted moving average of the scheduling weight of the proportional fair $V_{PF}$ is calculated.

Action 4 of FIG. 11. If the weighted moving average of the scheduling weight value of the target rate $V_{TR}$ is less than the threshold, there may be spare resource to increase the pending video buffer.

Action 5 of FIG. 11. If the weighted moving average of the scheduling weight of the proportional fair $V_{PF}$ is larger than the threshold, there is high potential for spare resource to be used for increasing the pending video in the playback buffer of the wireless device.

Action 6 of FIG. 11. The indication to the wireless device 120 or its client and/or server 130 is generated, which indication indicates whether to increase or decrease the pending video buffer size of the wireless device 120.

Figure 12:
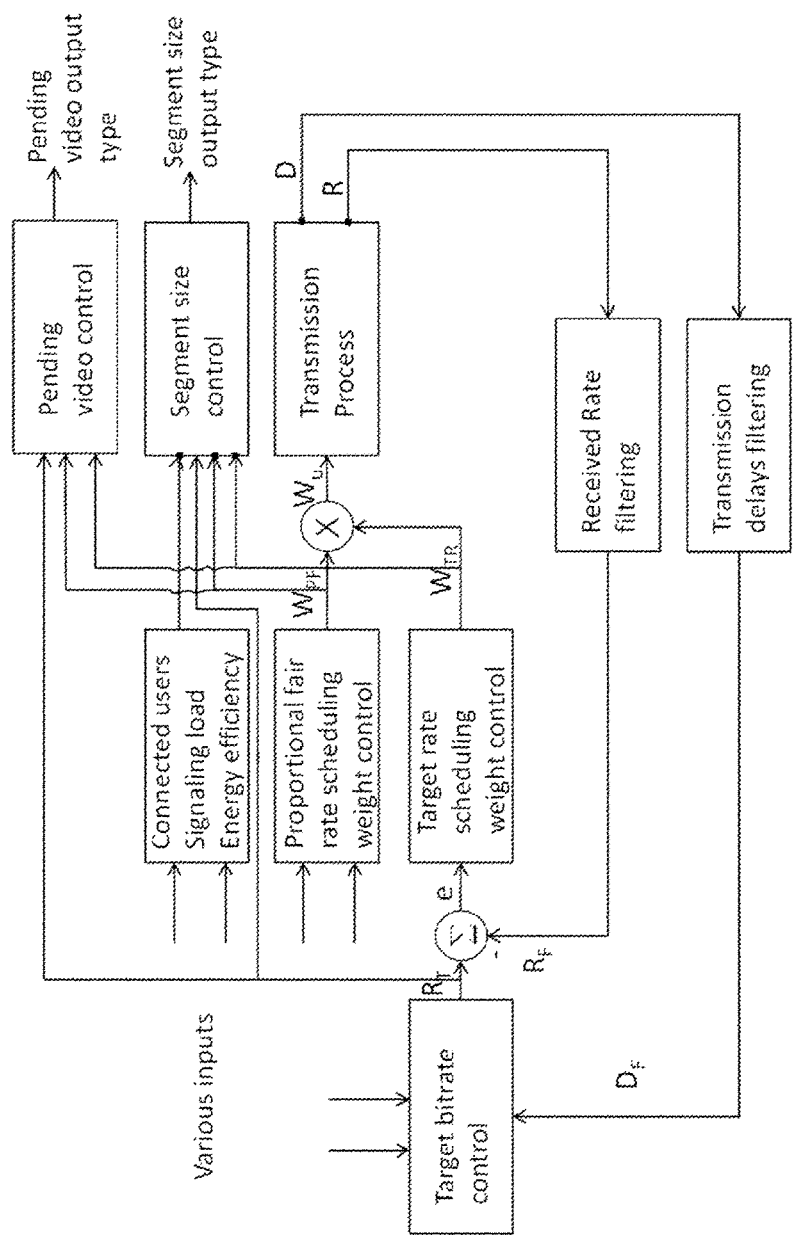
FIG. 12 is a schematic block diagram illustrating embodiments of a wireless communications network.

As described above the embodiments herein comprises four control units, outer- and inner bit rate control loops, segment size control and pending video control, which may all be connected to existing RAN control functionality. The scheme of FIG. 12 gives a total view of the control scheme of the video control connections according to embodiments herein.

The novelty with embodiments herein is that a target rate scheduling weight value is combined with existing scheduling weight values that together form a scheme for controlling the selection of a video segment size and give an indication whether the wireless device or it's HAS video client can increase the amount of pending video in the play-back buffer compared to the basic behavior. Further, the target rate scheduling weight value is based on a target bitrate set by an outer loop control. In addition the target bitrate control is also combined with a transmission delay rate jump or step based additive control.

Embodiments herein may be described according to the following example:

A control method for an adaptive streaming service including the control of the data transfer behavior of the source and the system for transferring the data, including the actions of:

determining a table of sizes of data segments based on at least one load measure determining a size of a data segment base on a function of at least one weight value;

determining an opportunity to increase the data volume to transfer;

determining a target bitrate of the data transfer based on network efficiency;

determining an additional target bitrate step to the to the target bitrate based on transmission delays;

determining a target bitrate weight value based on the target bitrate and the current used bitrate;

sending the target bit rate to the source;

using the weight value in a decision function whether to transfer data to the receiver for which the target bitrate weight value is valid In some embodiments said table is selected based on among;

Connected number of wireless devices in part of a transmission system

Load Due to Signaling Message

Energy efficiency of a transmission system including wireless device

In some embodiments the at least one weight value used for deciding data segment size is based on among target bitrate, target bitrate weight value, and proportional fair rate scheduling weight value.

In some embodiments the opportunity to increase the data volume to transfer is based on among target bitrate, target bitrate weight value, and proportional fair rate scheduling weight value.

Figure 13:
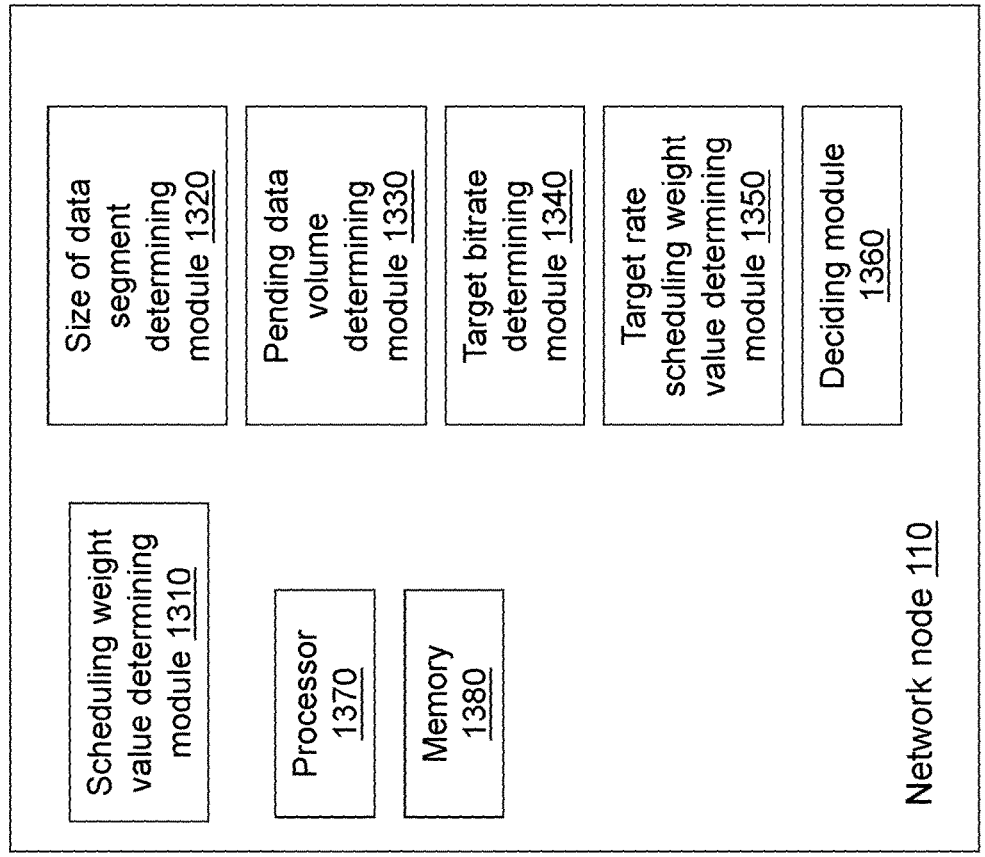
FIG. 13 is a schematic block diagram illustrating embodiments of a network node.

To perform the method actions relating to the process of controlling a data transfer related to video data of the video streaming service from the server 130 to the wireless device 120 described above in relation to FIG. 4, the network node 110 may comprises the following arrangement depicted in FIG. 13. As mentioned above, the network node 110 and wireless device 120 are arranged to operate in a wireless communications network 100.

The network node 110 is arranged to perform the process of controlling of data transfer by being configured to, e.g. by means of a scheduling weight value determining module 1310 configured to, determine a scheduling weight value for the wireless device 120 to be used in the data transfer, based on a target rate scheduling weight value and a proportional fair rate scheduling weight value.

The network node 110 is arranged to perform the process of controlling of data transfer by further being configured to, e.g. by means of a size of data segment determining module 1320 configured to, determine a size of data segment to be used in the data transfer based on at least part of the scheduling weight value.

In some embodiments, the network node 110 is arranged to perform the process of controlling of data transfer by further being configured to, e.g. by means of the size of data segment determining module 1320 configured to, determine the size of data segment by using a table of sizes of data segments based on at least one load measure of the wireless communications network 100, and by determining from the used table of sizes of data segments, the size of a data segment to be used for the data transfer based on at least part of the scheduling weight value.

In some embodiments, the network node 110 is arranged to perform the process of controlling of data transfer by further being configured to, e.g. by means of the size of data segment determining module 1320 configured to, determine the size of data segment to be used in the data transfer further based on at least one load measure of the wireless communications network 100.

The network node 110 is arranged to perform the process of controlling of data transfer by further being configured to, e.g. by means of a pending data volume determining module 1330 configured to, determine a pending data volume for the transferring of the video data to a play back buffer of the wireless device 120 based on at least part of the scheduling weight value.

The network node 110 may further be configured to e.g. by means of the target bitrate determining module 1330 configured to, determine the target bitrate of the data transfer further based on a transmission delay of part of or one or more video frames of the data transfer.

In some embodiments, the network node 110 is arranged to perform the process of controlling of data transfer by further being configured to, e.g. by means of the pending data volume determining module 1330 configured to, determine the pending data volume for the transferring of the video data to a play back buffer of the wireless device 120, further based on that the pace of transferring the video data to the play back buffer of the wireless device 120 shall be higher than what is consumed by the wireless device 120.

In some embodiments, the network node 110 is arranged to perform the process of controlling of data transfer by further being configured to, e.g. by means of a target bitrate determining module 1340 configured to, determine the target bitrate of the data transfer based on network operational efficiency of the wireless communications network 100.

In some embodiments, the network node 110 is arranged to perform the process of controlling of data transfer by further being configured to, e.g. by means of a target rate scheduling weight value determining module 1350 configured to, determine the target rate scheduling weight value of the data transfer based on a target bitrate of the data transfer. The scheduler weight value may be determined such that the achieved received bit rate of the wireless device 120 is the targeted bit rate of the data transfer.

In some embodiments, the network node 110 is arranged to perform the process of controlling of data transfer by further being configured to, e.g. by means of deciding module 1360 configured to, decide whether or not the video data of the video streaming service shall be transferred from the server 130 via the network node 110 to the wireless device 120 based on the scheduling weight value.

The embodiments herein comprising the process of controlling a data transfer related to video data of the video streaming service from the server 130 to the wireless device 120, may be implemented through one or more processors, such as a processor 1370 in the network node 110 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to network node 110.

The network node 110 may further comprise a memory 1380 comprising one or more memory units. The memory 1380 comprises instructions executable by the processor 1370.

The memory 1380 is arranged to be used to store e.g. scheduling weight values, size of data segments, pending data volume, target bitrate, target rate scheduling weight value, data, configurations, and applications to perform the methods herein when being executed in the network node 110.

Those skilled in the art will also appreciate that the scheduling weight value determining module 1310, the size of data segment determining module 1320, the pending data volume determining module 1330, the target bitrate determining module 1340, the target rate scheduling weight value determining module 1350, and the deciding module 1360 described above may refer to a combination of analog and digital circuits, and/or one or more processors configured with software and/or firmware, e.g. stored in the memory 1380, that when executed by the one or more processors such as the processor 1370 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The invention claimed is:

1. A method in a network node relating to a process of controlling a data transfer related to video data of a video streaming service from a server to a wireless device, the network node and wireless device operating in a wireless communications network, the controlling of data transfer comprising:

determining a scheduling weight value for the wireless device to be used in the data transfer based on a target rate scheduling weight value and a proportional fair rate scheduling weight value; wherein the proportional fair rate scheduling weight value is a ratio between a potential rate of the wireless device based on a current channel conditions and a recent received rate of the wireless device;

determining a size of data segment to be used in the data transfer based on at least part of the scheduling weight value;

determining a pending data volume for the transferring of the video data to a play back buffer of the wireless device based on at least part of the scheduling weight value, wherein determining the pending data volume for the transferring of the video data to a play back buffer of the wireless device is further based on a pace of transferring the video data to the play back buffer of the wireless device being higher than what is consumed by the wireless device; and deciding, using the scheduling weight value, whether the video data of the video streaming service will be transferred from the server via the network node to the wireless device for which a target bitrate weight value is valid.

2. The method according to claim 1, wherein the controlling of data transfer further comprises:
determining the target bitrate of the data transfer based on network operational efficiency of the wireless communications network.

3. The method according to claim 2, wherein determining the target bitrate of the data transfer further is based on transmission delay of part of or at least one video frame of the data transfer.

4. The method according to claim 2, wherein the controlling of data transfer further comprises:
determining the target rate scheduling weight value of the data transfer based on the target bitrate of the data transfer.

5. The method according to claim 1, wherein the controlling of data transfer further comprises:
determining the target rate scheduling weight value of the data transfer based on a target bitrate of the data transfer.

6. The method according to claim 1, wherein the scheduler weight value is determined such that the achieved received bit rate of the wireless device is the targeted bit rate of the data transfer.

7. The method according to claim 1, wherein determining the size of data segment is performed by using a table of sizes of data segments based on at least one load measure of the wireless communications network, and by determining from the used table of sizes of data segments, the size of a data segment to be used for the data transfer based on at least part of the scheduling weight value.

8. The method according to claim 1, wherein determining the size of data segment to be used in the data transfer is further based on at least one load measure of the wireless communications network.

9. A network node relating to a process of controlling a data transfer related to video data of a video streaming service from a server to a wireless device, network node and wireless device being configured to operate in a wireless communications network, the network node being configured to perform the process of controlling of data transfer by being configured to:
determine a scheduling weight value for the wireless device to be used in the data transfer based on a target rate scheduling weight value and a proportional fair rate scheduling weight value; wherein the proportional fair rate scheduling weight value is a ratio between a potential rate of the wireless device based on a current channel conditions and a recent received rate of the wireless device;

determine a size of data segment to be used in the data transfer based on at least part of the scheduling weight value;

determine a pending data volume for the transferring of the video data to a play back buffer of the wireless device based on at least part of the scheduling weight value, wherein the pending data volume for the transferring of the video data to a play back buffer of the wireless device is determined further based on a pace of transferring the video data to the play back buffer of the wireless device being higher than what is consumed by the wireless device; and decide, using the scheduling weight value, whether the video data of the video streaming service will be transferred from the server via the network node to the wireless device for which a target bitrate weight value is valid.

10. The network node according to claim 9, wherein the network node is configured to perform the process of controlling of data transfer by being further configured to:
determine the target bitrate of the data transfer based on network operational efficiency of the wireless communications network.

11. The network node according to claim 10, wherein the network node is further configured to determine the target bitrate of the data transfer further based on transmission delay of part of or at least one video frame of the data transfer.

12. The network node according to claim 10, wherein the network node is configured to perform the process of controlling of data transfer by being further configured to:
determine the target rate scheduling weight value of the data transfer based on the target bitrate of the data transfer.

13. The network node according to claim 9, wherein the network node is configured to perform the process of controlling of data transfer by being further configured to:
determine the target rate scheduling weight value of the data transfer based on a target bitrate of the data transfer.

14. The network node according to claim 9, wherein the scheduler weight value is to be determined such that the achieved received bit rate of the wireless device is the targeted bit rate of the data transfer.

15. The network node according to claim 9, wherein the network node is further configured to determine the size of data segment by using a table of sizes of data segments based on at least one load measure of the wireless communications network, and by determining from the used table of sizes of data segments, the size of a data segment to be used for the data transfer based on at least part of the scheduling weight value.

16. The network node according to claim 9, wherein the network node is further configured to determine the size of data segment to be used in the data transfer based further on at least one load measure of the wireless communications network.

* * * * *